(12) United States Patent
Zaitsu

(10) Patent No.: US 7,245,447 B2
(45) Date of Patent: Jul. 17, 2007

(54) MAGNETIC READ/WRITE APPARATUS HAVING A WRITE INHIBIT SLICE SETTING CIRCUIT

(75) Inventor: Hideki Zaitsu, Fujisawa (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 112 days.

(21) Appl. No.: 10/666,000

(22) Filed: Sep. 17, 2003

(65) Prior Publication Data

US 2004/0190188 A1 Sep. 30, 2004

(30) Foreign Application Priority Data

Mar. 28, 2003 (JP) ............................. 2003-092749

(51) Int. Cl.
*G11B 5/596* (2006.01)
(52) U.S. Cl. ..................................... 360/60; 360/77.02
(58) Field of Classification Search ..................... None
See application file for complete search history.

(56) References Cited

U.S. PATENT DOCUMENTS 5,923,485 A * 7/1999 Ito ............................... 360/31
6,215,608 B1 * 4/2001 Serrano et al. ................ 360/60
6,510,014 B2 * 1/2003 Kikuta et al. .................. 360/60
6,657,804 B1 * 12/2003 Tomiyama et al. ........... 360/60
7,076,604 B1 * 7/2006 Thelin ......................... 711/112
2002/0030915 A1 * 3/2002 Nishida et al. ................ 360/60

FOREIGN PATENT DOCUMENTS

| JP | 2000173005 A | 6/2000 |
| JP | 2002092803 A | 3/2002 |
| JP | 2002133802 A | 5/2002 |

* cited by examiner

*Primary Examiner*—Andrea Wellington
*Assistant Examiner*—Varsha A. Kapadia
(74) *Attorney, Agent, or Firm*—Townsend and Townsend and Crew LLP

(57) ABSTRACT

A magnetic read/write apparatus comprises: a recording medium; and a head for writing/reading data to/from each sector on the recording medium; wherein the magnetic read/write apparatus further comprises: a write inhibit slice setting circuit for, when data is written to the recording medium, setting a write inhibit slice for each sector based on the recording state of each sector on the recording medium.

3 Claims, 20 Drawing Sheets

FIG.2
(a) 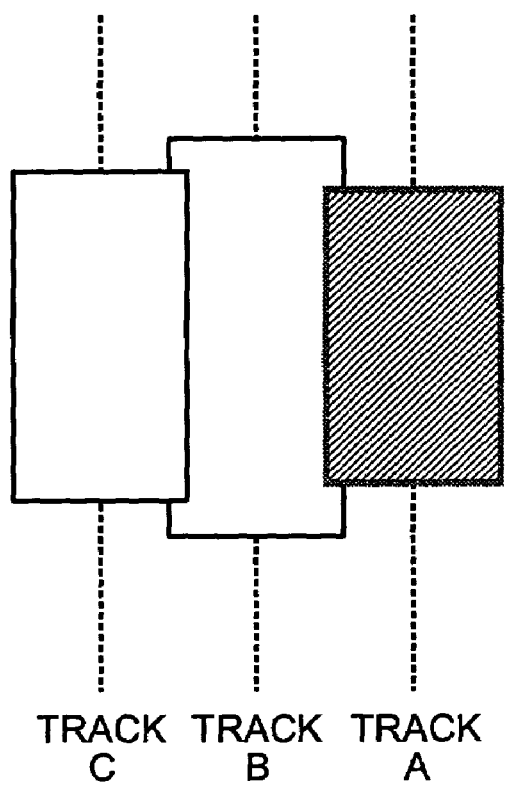
TRACK C  TRACK B  TRACK A
(b) 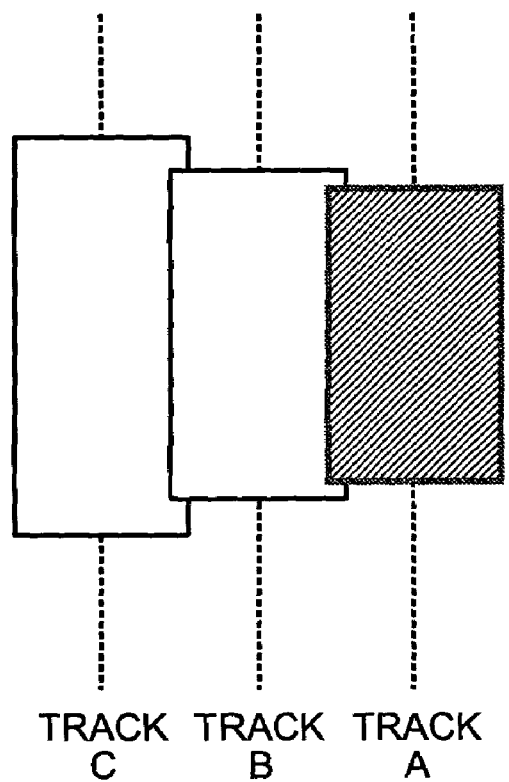
TRACK C  TRACK B  TRACK A

MAGNETIC READ/WRITE APPARATUS HAVING A WRITE INHIBIT SLICE SETTING CIRCUIT

CROSS-REFERENCES TO RELATED APPLICATIONS

This application claims priority to Japanese application No. 2003-092749, filed Mar. 28, 2003, the disclosure of which is incorporated by reference.

BACKGROUND OF THE INVENTION

1. Field of the Invention

The present invention relates to a magnetic read/write apparatus, and more particularly to a technique effective in reducing the occurrence of erasure of neighboring tracks and increasing the track density.

2. Description of Related Art

A magnetic read/write apparatus writes data onto a plurality of tracks as magnetized patterns. When a write operation is performed, a head seeks a track specified by servo information written in a servo sector, and after the head is positioned in place, data is written onto a surface of the medium.

At that time, whether the head has been positioned in place is determined based on the amount of displacement of the head from the center of the target track used as a reference. If the amount of displacement is within a predetermined threshold value, the write operation is carried out. If it is larger than the threshold value, the write operation is inhibited. This threshold value is referred to as a write inhibit slice.

The write inhibit slice must be set to an optimum value in terms of protection of the data on the neighboring tracks and the data transfer rate in the write operation. Conventionally, the write inhibit slice is generally set to a fixed value for each drive model; no more than one write inhibit slice value is used within a same drive.

However, the value of the write inhibit slice can be properly set and controlled so as to avoid fatal problems such as direct erasure of neighboring tracks while increasing the track density.

Conventionally, to accomplish the above object, the write inhibit slice may be set asymmetrical about the center of the track to prevent erasure of neighboring tracks due to the asymmetry of the shape of the erase band attributed to the skew angle of the head, as described in, for example, Japanese Patent Laid-Open No. 2000-173005. Further, the write inhibit slice may be set to different values depending on the recording radial position of each track on the disk to reduce variations in the frequency of write inhibit operations (frequency of occurrence of write faults) among the disk radial positions due to variations in the head alignment accuracy among the disk radial positions, as described in, for example, Japanese Patent Laid-Open No. 2002-92803. Still further, write position information on each sector may be stored such that when a read operation is performed, the read head can accurately trace the write positions (path) at which the data was written and thereby enhance the reliability of the read data, as described in, for example, Japanese Patent Laid-Open No. 2002-133802.

The methods described in the above Japanese Laid-Open Patent Publications were devised to solve the problems caused by increased track density. To further increase the track density, however, it is necessary to address, in addition to the above problems, the problem that as the number of write operations performed on a same sector increases, the data in its neighboring sectors (tracks) are gradually erased (erasure of neighboring tracks).

This phenomenon may occur when a high magnetic field is produced even though a write head for a narrow track width is used in order to provide a write magnetic field higher than that conventionally employed. At that time, the magnetic field leaks in the track width direction of the write head. This significant problem must be solved in order to further increase the track density.

Since the methods described in the above Japanese Laid-Open Patent Publications can hardly prevent occurrence of the above phenomenon, a new write control method must be devised to solve the problem.

BRIEF SUMMARY OF THE INVENTION

An object of the present invention is to provide a magnetic read/write apparatus with high track density capable of preventing erasure of written data due to the above-described erasure of neighboring tracks as well as reducing the decrease in the data transfer rate as much as possible.

A magnetic read/write apparatus of the present invention comprises: a recording medium; and a head for writing/reading data to/from each sector on the recording medium; wherein the magnetic read/write apparatus further comprises: write inhibit slice setting means for, when data is written to the recording medium, setting a write inhibit slice for each sector based on the recording state of the each sector on the recording medium.

Another magnetic read/write apparatus of the present invention comprises: a recording medium; and a head for writing/reading data to/from each sector on the recording medium; wherein the magnetic read/write apparatus further comprises rewriting means for, when data is written to the recording medium, performing steps of: counting the number of write operations performed on each sector; storing the information (the number of write operations performed on the each sector); if the number of write operations performed on a sector is larger than a predetermined value, reading (data from) neighboring sectors on one or both sides of the sector; and rewriting (the sector) with the read data.

Still another magnetic read/write apparatus of the present invention comprises: a recording medium; and a plurality of heads for writing/reading data to/from each sector on the recording medium; wherein the magnetic read/write apparatus further comprises write inhibit slice setting means for performing steps of: writing a write inhibit slice correction value for each head beforehand; and when data is written to the recording medium, setting a write inhibit slice for each sector based on the recording state of each sector on the recording medium and the write inhibit slice correction value for each head.

BRIEF DESCRIPTION OF THE DRAWINGS

FIG. 2 includes FIGS. 2(a) and 2(b) which are diagrams each showing a recording track arrangement according to the first embodiment of the present invention.

Figure 1:
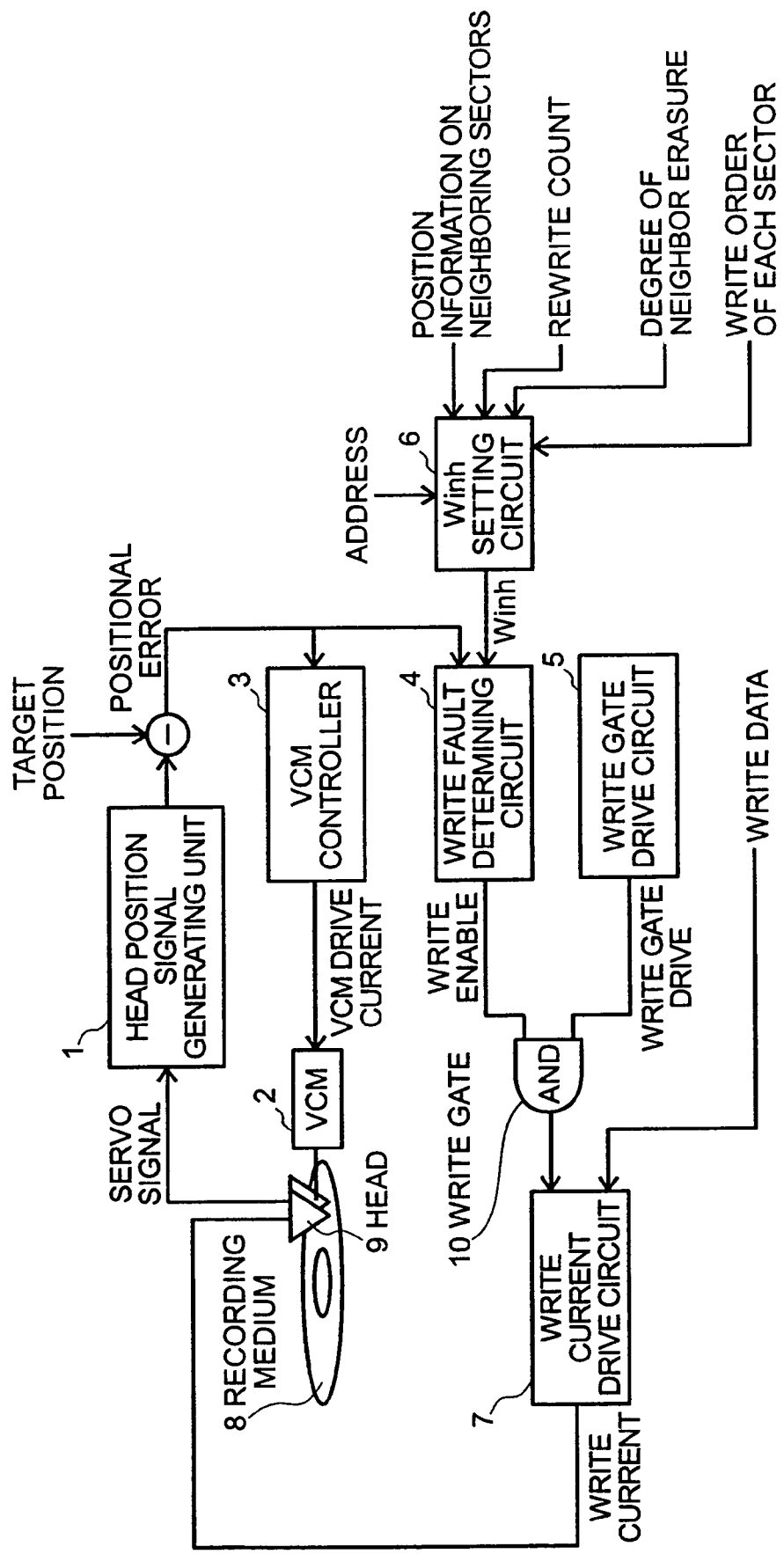
FIG. 1 is a diagram showing the configuration of a magnetic read/write apparatus according to a first embodiment of the present invention.

The following table includes a description of reference numerals.

| | |
|---|---|
| 1 | head position signal generating unit |
| 2 | VCM (voice coil motor) |
| 3 | VCM controller |
| 4 | write fault determining circuit |
| 5 | write gate drive circuit |
| 6 | Winh (write inhibit slice) setting circuit (write inhibit slice setting means) |
| 7 | write current drive circuit |
| 8 | recording medium |
| 9 | head |
| 10 | write gate |
| 20 | RAM (memory means) |
| 21 | target position specifying unit |
| 30 | comparator |

DESCRIPTION OF ILLUSTRATIVE EMBODIMENTS

Preferred embodiments of the present invention will be described below in detail with reference to the accompanying drawings. It should be noted that like reference numerals will be used to denote like components throughout all the drawings for description of the embodiments to avoid undue repetition.

First Embodiment

FIG. 1 is a diagram showing the configuration of a magnetic read/write apparatus according to a first embodiment of the present invention.

Referring to the figure, the magnetic read/write apparatus comprises a head position signal generating unit 1, a VCM (voice coil motor) 2, a VCM controller 3, a write fault determining circuit 4, a write gate drive circuit 5, a Winh (write inhibit slice) setting circuit 6 (write inhibit slice setting means), a write current drive circuit 7, a recording medium 8, a head 9, and a write gate 10. The Winh setting circuit 6 receives: an address; the write order of each sector (information on the write order is written on a sector basis); position information on neighboring sectors such as the amount of displacement of the write position of each neighboring sector from the center of its track; information on the degree of "proximity erasure" (erasure of neighboring tracks) by each head 9; and information on the rewrite counts of neighboring sectors.

Generally, a servo signal read by a head 9 is input to the head position signal generating unit 1 which then generates a head position signal. The VCM 2 is driven by the VCM controller 3 such that the difference between the position (of the head) and a target position is reduced to 0, positioning the head 9 in place.

In a write operation, the write fault determining circuit 4 compares the positional error signal with the write inhibit slice (Winh). If it is determined that the position of the head 9 exceeds the write inhibit slice (Winh), the write fault determining circuit 4 forcibly closes the write gate 10 to inhibit the write operation.

The Winh setting circuit 6 sets the value of the write inhibit slice (Winh) based on a received write address (sector), write order of each sector, position information on neighboring sectors, information on the degree of proximity erasure by each head 9, and information on the rewrite counts of neighboring sectors. The set value is used by the write fault determining circuit 6 to determine whether the write operation should be permitted or inhibited.

In the above description of the present embodiment, the value of the write inhibit slice (Winh) is determined based on all of the above four pieces of information in addition to the address at which the write operation is carried out. However, the value of the write inhibit slice (Winh) may be determined using one or more pieces of information selected from among the above four pieces of information in addition to the write address.

Description will be made below of an outline of how to set a write inhibit slice (Winh).

FIG. 2 includes FIGS. 2(a) and (b) each showing a recording track arrangement according to the first embodiment, wherein two tracks B and C are formed on the left side of a track A to which a write operation is to be performed. Specifically, FIG. 2(a) shows an arrangement in which the write operation to the track C was performed after the write operation to the track B, while FIG. 2(b) shows an arrangement in which the write operation to the track C was performed before the write operation to the track B.

Figure 3:
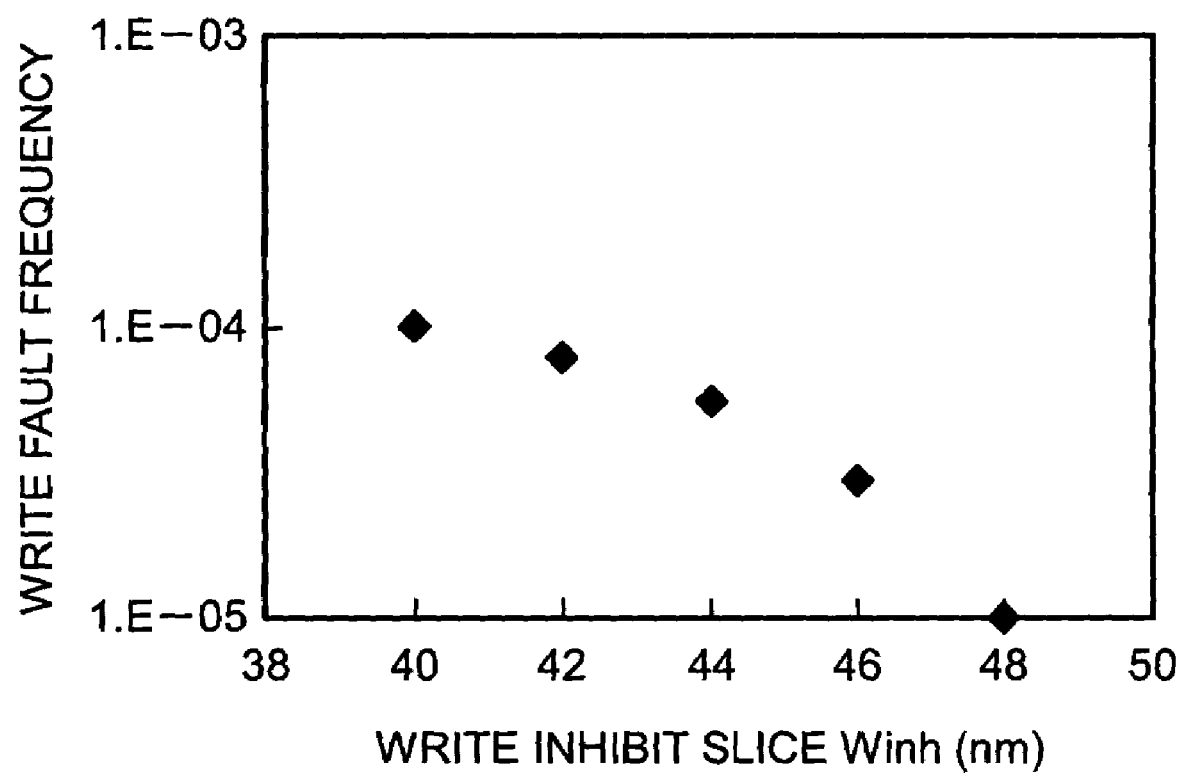
FIG. 3 is a diagram showing the relationship between the write inhibit slice and the frequency of occurrence of write faults according to the first embodiment of the present invention.
Figure 4:
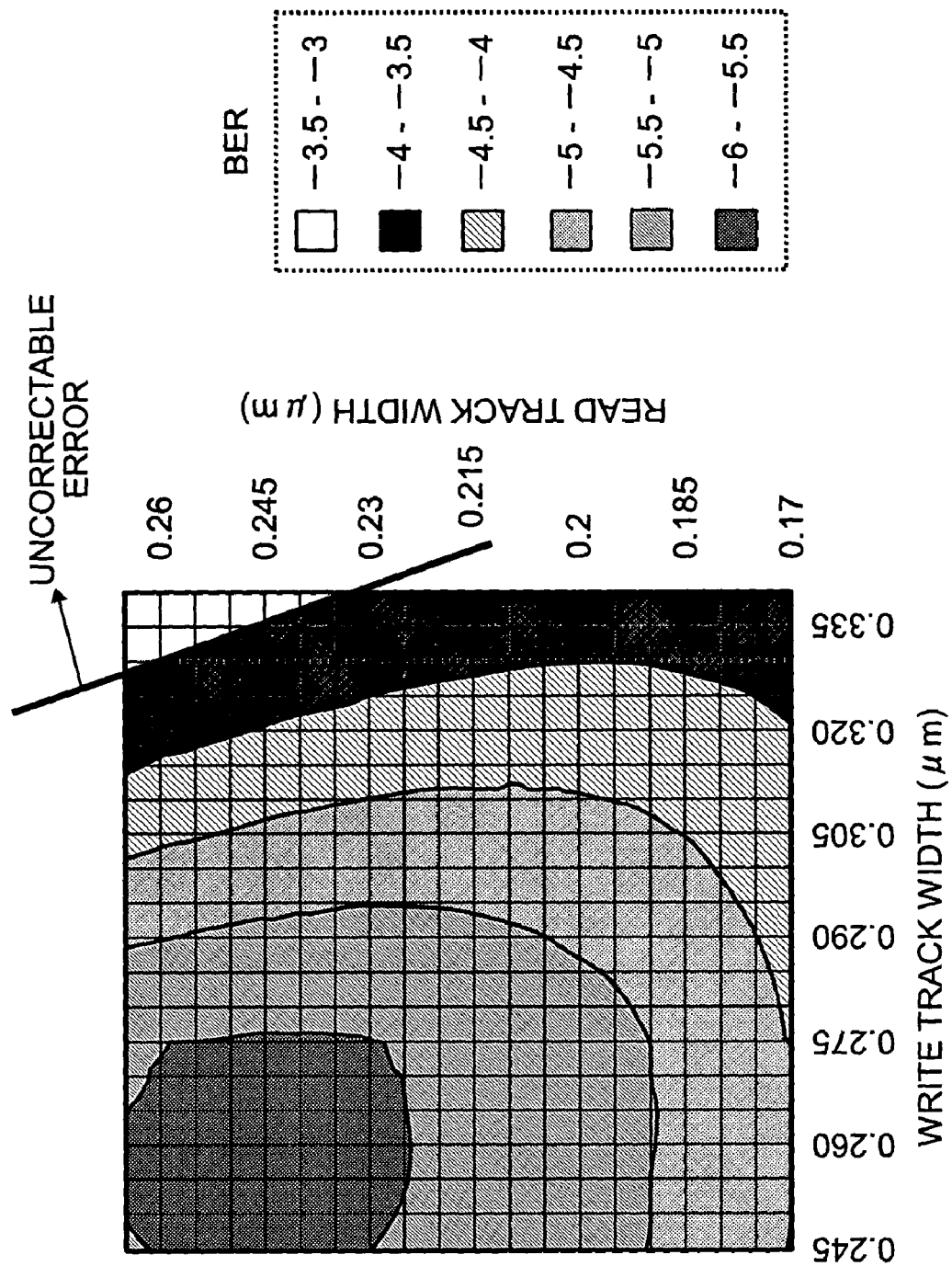
FIG. 4 is a diagram showing the relationship between the read/write track widths and the BER (bit error rate) with a certain write inhibit slice according to the first embodiment of the present invention.

FIG. 3 is a diagram showing the relationship between the write inhibit slice and the frequency of occurrence of write faults according to the first embodiment. FIG. 4 is a diagram showing the relationship between the read/write track widths and the BER (bit error rate) with a certain write inhibit slice according to the first embodiment.

According to the present embodiment, to prevent erasure of neighboring tracks from causing any problems in the magnetic read/write apparatus, the apparatus stores at least one piece of information selected from among the write order of each sector, position information on neighboring sectors such as the amount of displacement of the write position of each neighboring sector from the center of its track, information on the degree of proximity erasure by each head, and the rewrite counts of neighboring sectors. The magnetic read/write apparatus sets a write inhibit slice (Winh) for each sector based on these pieces of information so as to optimize the information protection capability and the transfer rate in the write operation.

In the case of the arrangement shown in FIG. 2(a), the track B receives proximity erasure action from both tracks A and C when data is written on the track A. Therefore, the data on the track B might easily disappear.

In this arrangement, if a write operation to the track A is considerably shifted toward the track B side, the data on the track B will be erased, increasing the possibility of being unable to read the data. To solve the above problem, the write inhibit slice (Winh) is reduced so as to prevent the track A from shifting toward the track B side.

In the case of the arrangement shown in FIG. 2(b), on the other hand, the track B receives proximity erasure action from only the track A. As a result, the possibility of being unable to read the data is lower than that for the arrangement shown in FIG. 2(a). Therefore, in the arrangement shown in FIG. 2(b), the write inhibit slice (Winh) is increased to give priority to the transfer rate in the write operation.

Likewise, a write inhibit slice (Winh) may also be set for each sector (track) on the right side of the track A. As a result, the write inhibit slice (Winh) on one side (of the track A) may be different from that on the other side.

Further, the write inhibit slice (Winh) can be set more appropriately by storing position information on neighboring sectors such as the amount of displacement of the position of data written on the track B or C from the center of its track, or information on the degree of proximity erasure by each head 9. The information on the degree of proximity erasure by each head 9 is set based on the magnetic characteristics of each head 9 in the write operation measured beforehand. This arrangement allows balancing the data protection and the data transfer rate.

Still further, as the number of write operations (on a same sector) increases, the data on the neighboring tracks is gradually erased. Therefore, the data in the neighboring sectors (tracks) may be automatically rewritten after a predetermined number of write operations are carried out on the sector, making it possible to prevent data loss.

As shown in FIG. 3, the smaller the write inhibit slice (Winh), the higher the frequency of occurrence of write faults. Therefore, the value of the write inhibit slice (Winh) is generally set such that the frequency of occurrence of write faults does not exceed a preset value.

Still further, as shown in FIG. 4, uncorrectable errors occur when the BER (bit error rate) is higher than a certain value. An uncorrectable error is an error which cannot be corrected (decoded) by the apparatus. If the frequency of occurrence of this error is high, the apparatus cannot correct (decode) the data even after retry operations.

Generally, the value of the write inhibit slice (Winh) is set such that the frequency of occurrence of write faults shown in FIG. 3 does not exceed a preset value and no uncorrectable error occurs with the set read/write track widths.

If the value of the write inhibit slice (Winh) is fixed as in conventional methods, it must be guaranteed (the value is set such) that no uncorrectable error occurs even when a recording track to be read is overlapped an amount equal to the write inhibit slice (Winh) by its neighboring tracks on both sides.

However, there is only a low possibility that a track to be read is overlapped as much as the write inhibit slice (Winh) by its neighboring tacks on both sides. Furthermore, an uncorrectable error does not occur even with a larger write inhibit slice (Winh) value in many cases. Accordingly, as in the present embodiment, setting a write inhibit slice (Winh) for each sector makes it possible to increase the data transfer rate in the write operation.

Description will be made below of a specific example of how to set a write inhibit slice (Winh) based on the write order of each sector and position information on neighboring sectors.

Figure 5:
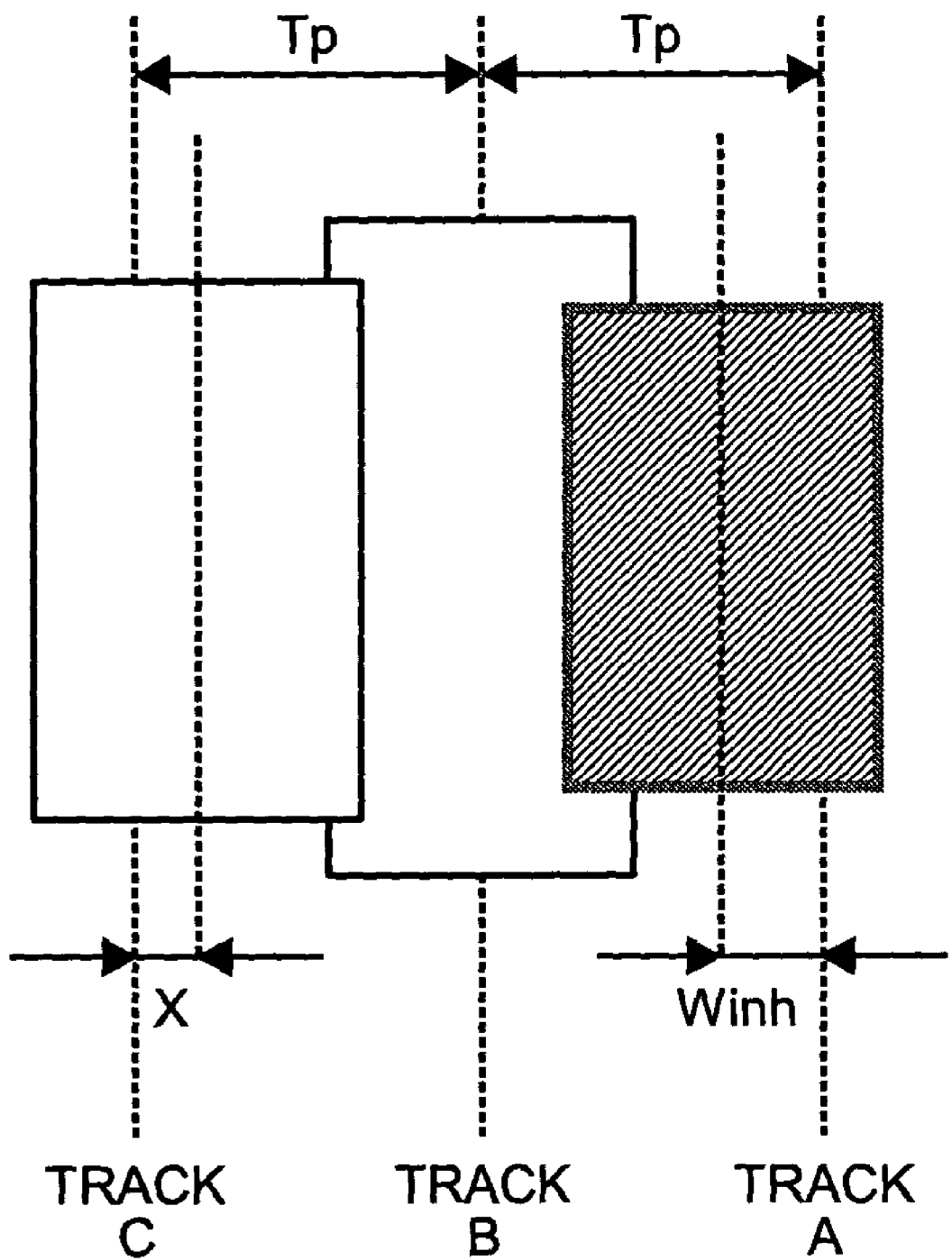
FIG. 5 is a diagram showing a recording track arrangement in which the write positions of sectors are misaligned with respect to the centers of their respective tracks according to the first embodiment of the present invention.
Figure 6:
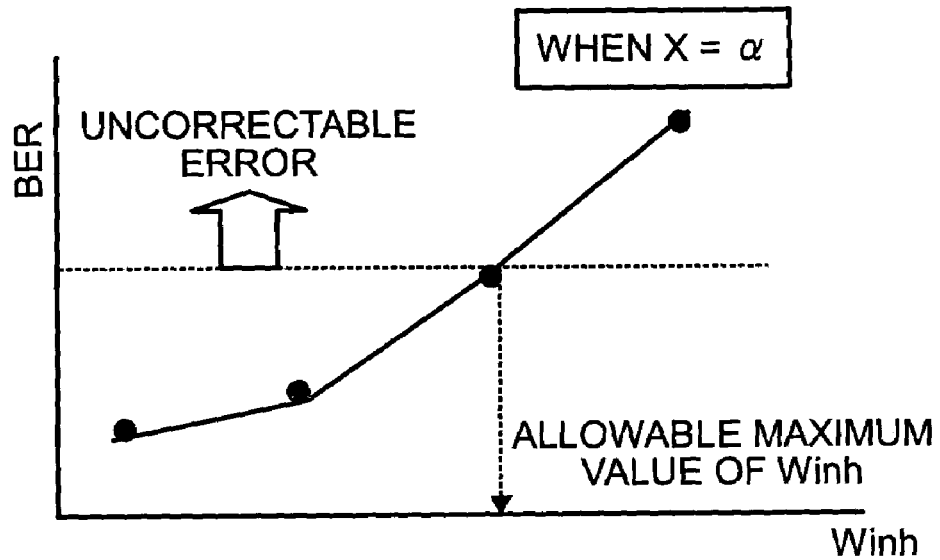
FIG. 6 is a diagram showing the relationship between the write inhibit slice and the BER (bit error rate) according to the first embodiment of the present invention.
Figure 7:
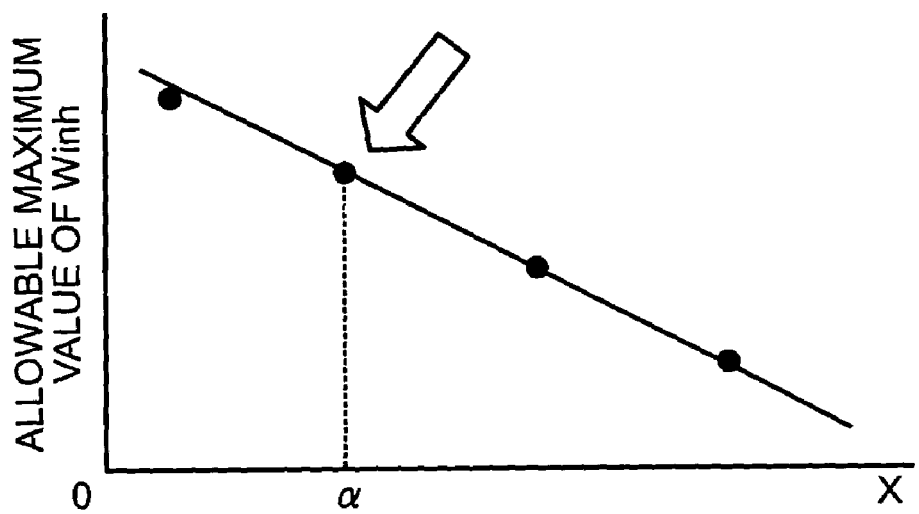
FIG. 7 is a diagram showing the relationship between the amount of displacement of the write position of a sector from the center of its track and the allowable maximum write inhibit slice value according to the first embodiment of the present invention.

FIG. 5 is a diagram showing a recording track arrangement in which the write positions of sectors are misaligned with respect to the centers of their respective tracks according to the first embodiment. FIG. 6 is a diagram showing the relationship between the write inhibit slice and the BER (bit error rate) according to the first embodiment. FIG. 7 is a diagram showing the relationship between the amount of displacement of the write position of a sector from the center of its track and the allowable maximum write inhibit slice value according to the first embodiment.

Assume that, as shown in FIG. 5, a track C has been written such that it is displaced toward the track B side by a distance of X (=α) with respect to track pitch Tp. Further assume that a track A is then written such that it is displaced by a distance equal to a set write inhibit slice (Winh). In such a case, the larger the set write inhibit slice (Winh), the higher the BER (bit error rate) of the track B in the read operation. An uncorrectable error occurs when the BER (bit error rate) is higher than a certain value, making it impossible to correct (decode) the data.

The allowable maximum write inhibit slice (Winh) value when X=α is obtained as shown in FIG. 6.

FIG. 7 shows changes in the allowable maximum write inhibit slice (Winh) value with changing amount of displacement (X) of the write position of the sector from the center of its track. According to the present embodiment, since the value of X is known, the allowable maximum write inhibit slice value when the tack A is written can be set based on the relationship shown in FIG. 7.

It should be noted that the write inhibit slice (Winh) on the right side of the track A can be set in the same manner.

Description will be made below of a specific example of how to set a write inhibit slice (Winh) based on the write order of each sector, or both the write order of each sector and position information on neighboring sectors.

Figure 8:
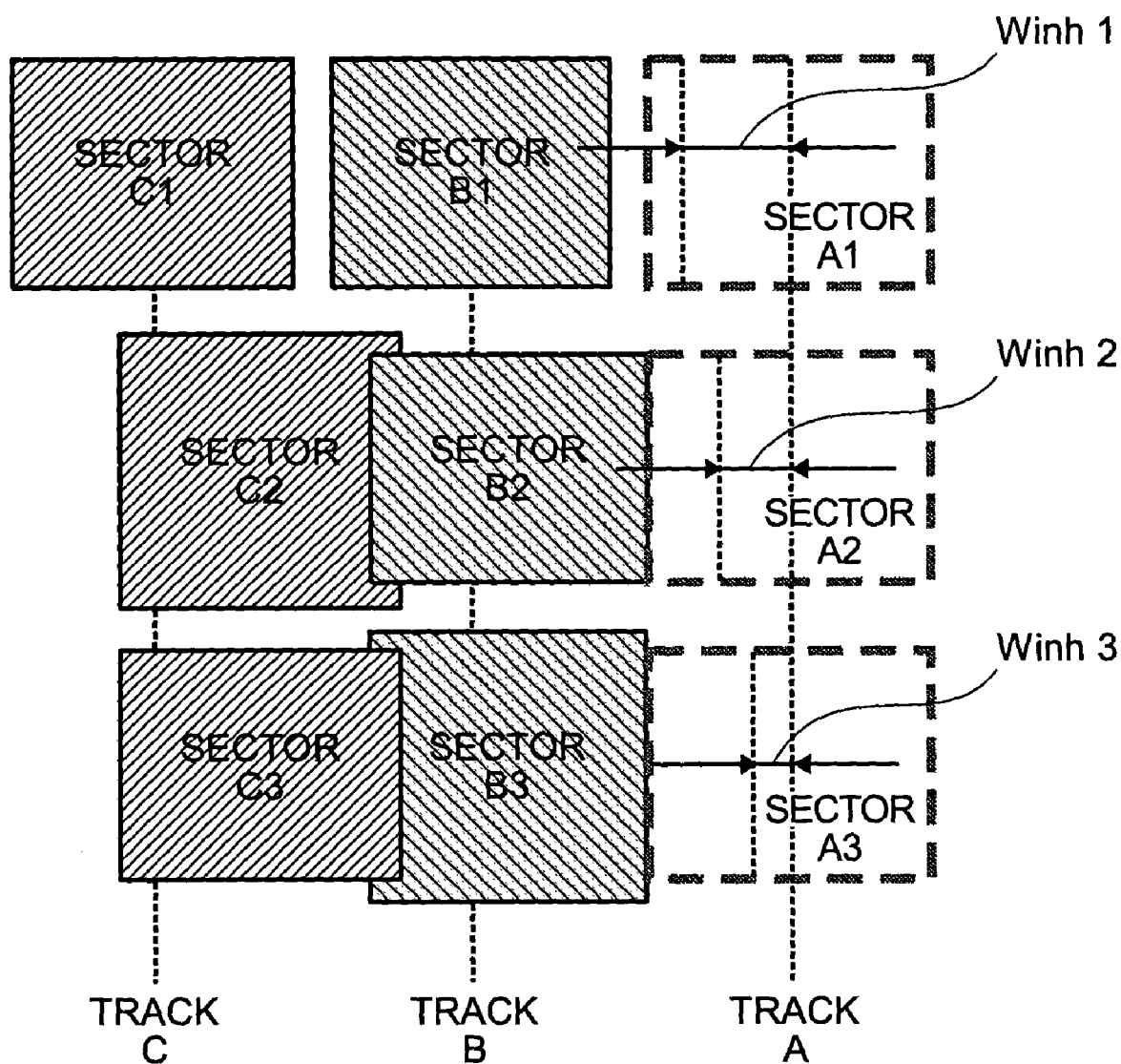
FIG. 8 is a diagram showing a recording track arrangement in which the write inhibit slice (Winh) is set to different values according to the first embodiment of the present invention.

FIG. 8 is a diagram showing a recording track arrangement in which the write inhibit slice (Winh) is set to different values according to the first embodiment.

Consider a write operation to a sector A1. Since a sector B1 adjacent to the sector A1 and a sector C1 adjacent to the sector B1 are written at the centers of their respective tracks, the data in the sector B1 can be protected in a write operation to the sector A1 even with the write inhibit slice (Winh) set to a large value. In this case, therefore, the write inhibit slice can be set to a large value (Winh 1) to increase the data transfer rate in the write operation.

On the other hand, a sector B2 adjacent to a sector A2 is written such that it is at an off track position toward the sector A2 side, and a sector C2 adjacent to the sector B2 was written before writing the sector B2. Therefore, although the sector B2 does not receive proximity erasure action from the sector C2, it tends to receive proximity erasure action when the sector A2 is written. Accordingly, the write inhibit slice (Winh) with which to write the sector A2 must be set to a value smaller than that for the sector A1 (as indicated by reference numeral Winh2 in the figure).

Further, the amounts of displacement of sectors B3 and C3 from the centers of their respective tacks are the same as those of the sectors B2 and C2, respectively. Since the sector C3 was written after writing the sector B3, the sector B3 received proximity erasure action when the sector C3 was written. Therefore, the write inhibit slice with which to write a sector A3 must be set to a value smaller than that for the sector A2 (as indicated by reference numeral Winh3 in the figure).

Thus, in the example shown in FIG. 8, the write inhibit slices Winh1, Winh2, and Winh3 have the following relationship: Winh1>Winh2>Winh3.

Description will be made below of a specific example of how to set a write inhibit slice (Winh) based on information on the degree of proximity erasure by each head.

Figure 9:
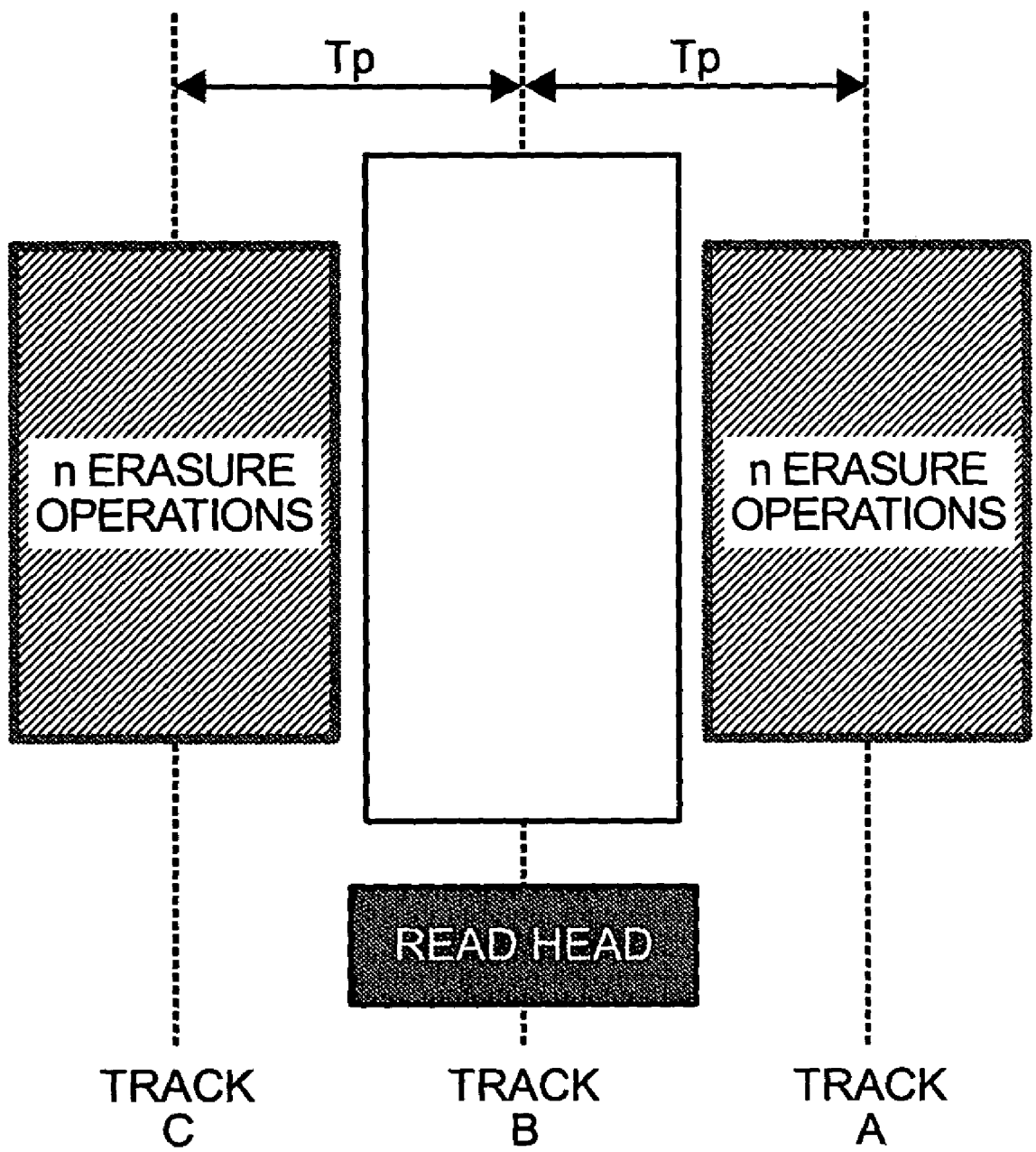
FIG. 9 is a diagram showing a recording track arrangement employed to evaluate the degree of proximity erasure by each head according to the first embodiment of the present invention.
Figure 10:
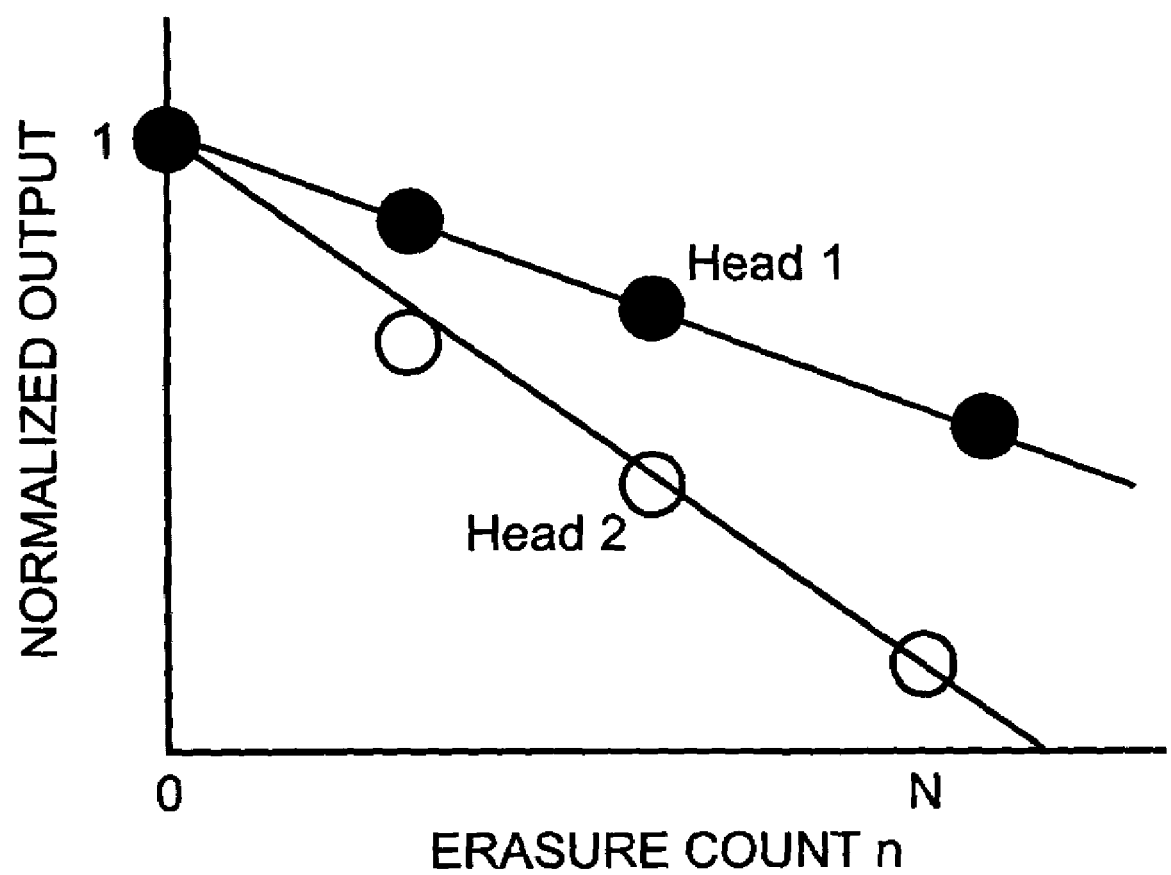
FIG. 10 is a diagram showing the relationship between the neighboring track erasure count and the normalized output according to the first embodiment of the present invention.

FIG. 9 is a diagram showing a recording track arrangement employed to evaluate the degree of proximity erasure by each head according to the first embodiment, while FIG. 10 is a diagram showing the relationship between the neighboring track erasure count and the normalized output according to the first embodiment.

After a pattern is written on a track B, n number of erasure operations are performed on both neighboring tracks (tracks A and C). Then, the track B is read and the read signal is measured to determine its attenuation.

As shown in FIG. 10, when n number of erasure operations are performed, the head Head2 exerting strong proximity erasure action exhibits an amount of output attenuation greater than that exhibited by the head Head1 exerting weak proximity erasure action. Accordingly, the value of the write inhibit slice (Winh) may be set for each head based on the normalized output of each head obtained when n number of erasure operations are carried out.

Second Embodiment

According to the first embodiment, the Winh setting circuit 6 receives: an address; the write order of each sector (information on the write order is written on a sector basis); position information on neighboring sectors such as the amount of displacement of the write position of each neighboring sector from the center of its track; information on the degree of proximity erasure by each head 9; and information on the rewrite counts of neighboring sectors. The Winh setting circuit 6 then sets a write inhibit slice for each sector based on these pieces of information. The second embodiment, on the other hand, uses a write inhibit slice setting table to set a write inhibit slice (Winh).

Figure 11:
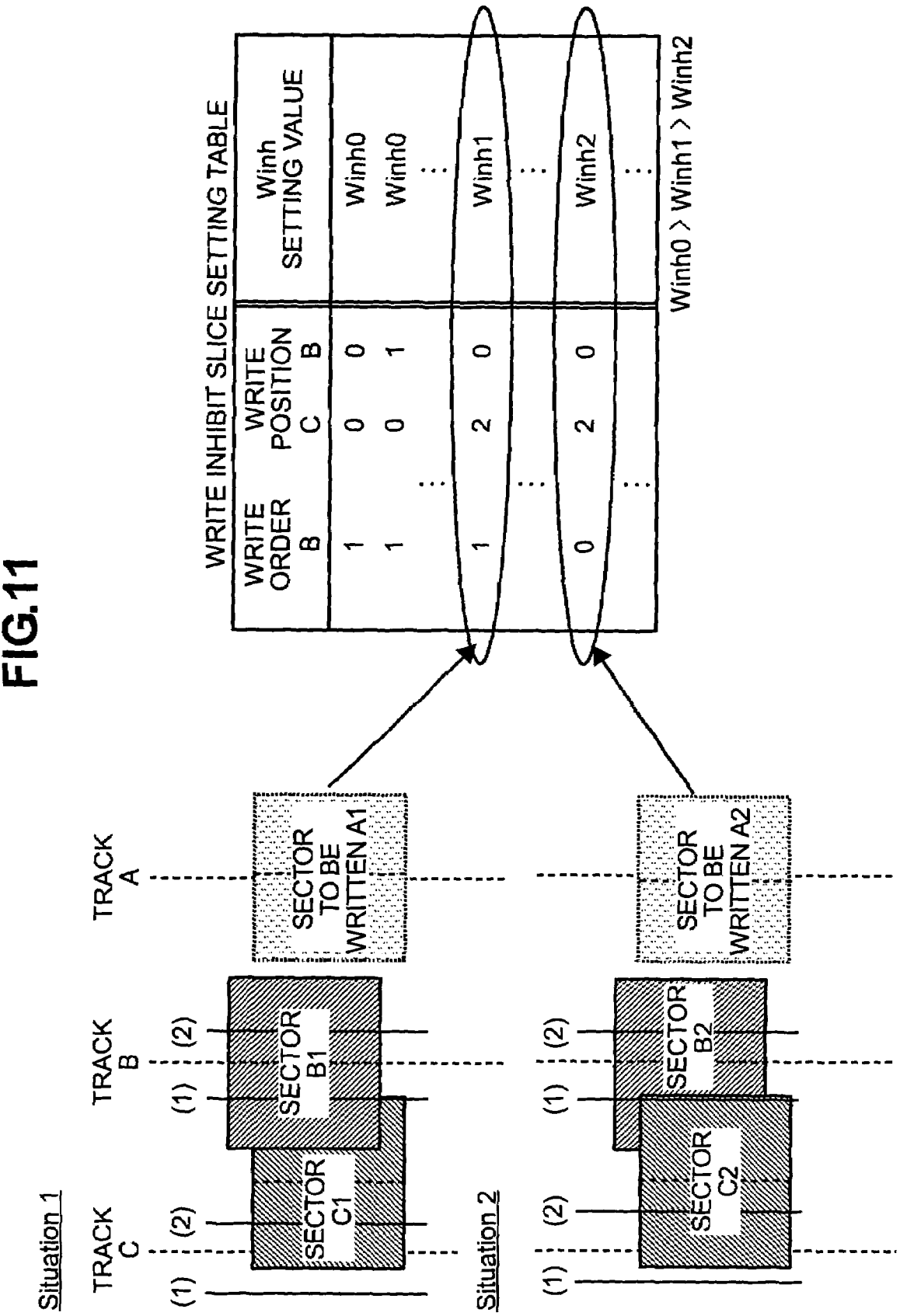
FIG. 11 is a diagram showing an example of how to set write inhibit slices according to a second embodiment of the present invention.
Figure 12:
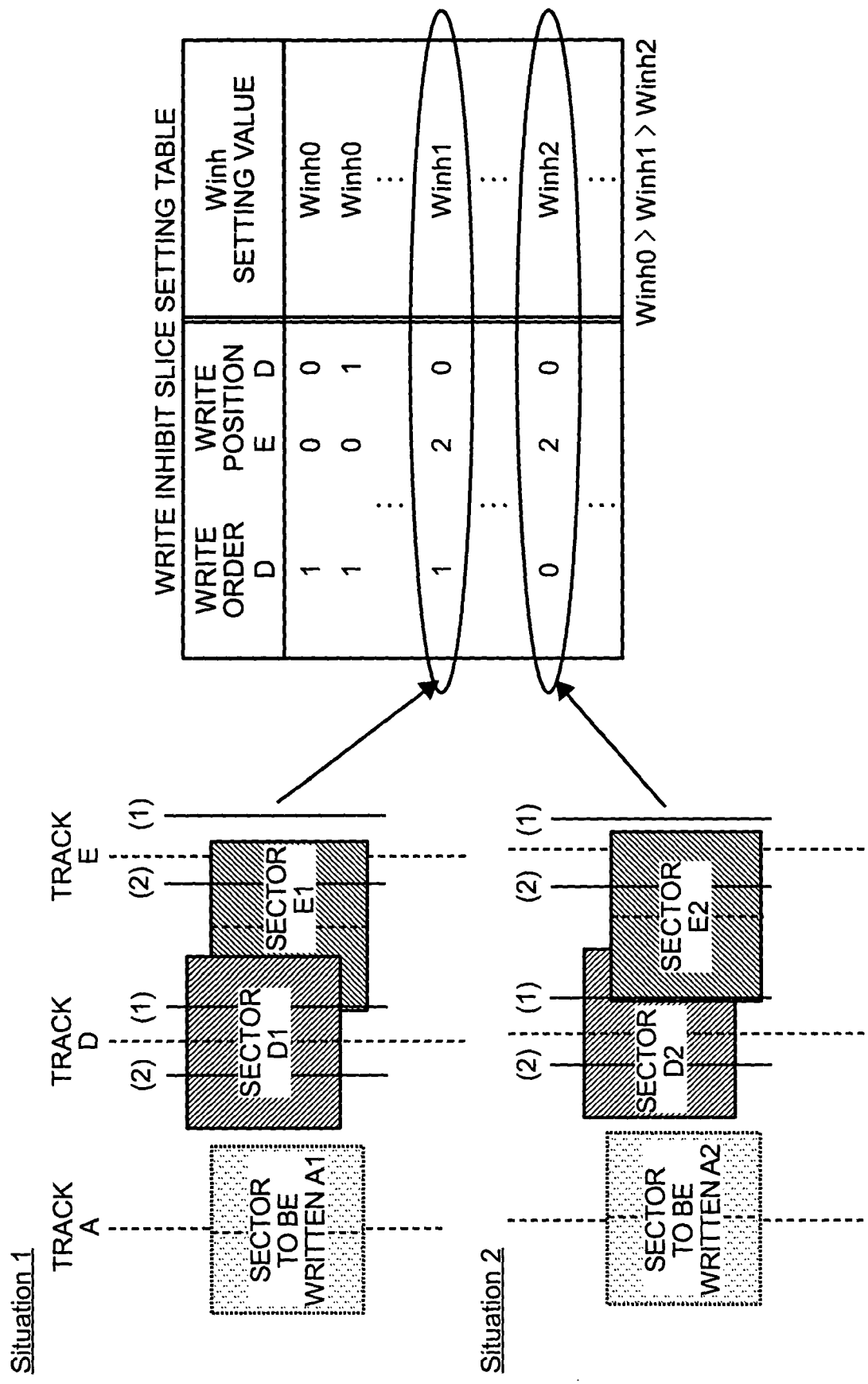
FIG. 12 is a diagram showing another example of how to set write inhibit slices according to the second embodiment of the present invention.

FIGS. 11 and 12 are diagrams showing an example of how to set write inhibit slices according to the second embodiment.

Specifically, in the example shown FIGS. 11 and 12, write inhibit slices are set when sectors are written on a track A. FIG. 11 only shows sectors on the left side of a sector A1, while FIG. 12 only shows sectors on the right side of the sector A1.

In the case of the sectors to the left of the sector A1, the write inhibit slice setting table of FIG. 11 shows whether each sector was written before or after writing the sector on its left side, thereby indicating the write order of each sector. If a sector was written before writing the sector on its left side, its write order field in the table is set to "0"; otherwise, it is set to "1".

In the arrangement Situation 1 shown in FIG. 11, a sector B1 was written on a tack B after a sector C1 was written. Therefore, the write order field of the sector B1 is set to "1". In the arrangement Situation 2, on the other hand, a sector B2 was written on the track B before a sector C2 was written. Therefore, the write order field of the sector B2 is set to "0".

The write position of each sector is indicated by using as references two positions, position (1) and position (2), set on the left and right sides of the center of its track, respectively. If a sector was written with the head positioned to the left of position (1), the write position field of the sector in the table is set to "1". If the head was positioned between positions (1) and (2) when the sector was written, the write position field of the sector in the table is set to "0". If the sector was written with the head positioned to the right of position (2), the write position field of the sector in the table is set to "2". The distances from the center of the track to positions (1) and (2) are set smaller than the write inhibit slices (Winh).

In the case of the sectors to the right of the sector A1, the write inhibit slice setting table of FIG. 12 shows whether each sector was written before or after writing the sector on its right side, thereby indicating the write order of each sector. If a sector was written before writing the sector on its right side, its write order field in the table is set to "0"; otherwise, it is set to "1".

In the arrangement Situation 1 shown in FIG. 12, a sector D1 was written on a track D after a sector E1 was written. Therefore, the write order field of the sector D1 is set to "1". In the arrangement Situation 2, on the other hand, a sector D2 was written on the track D before a sector E2 was written. Therefore, the write order field of the sector D2 is set to "0".

The write position of each sector is indicated by using as references two positions, position (1) and position (2), set on the right and left sides of the center of its track, respectively. If a sector was written with the head positioned to the right of position (1), the write position field of the sector in the table is set to "1". If the head was positioned between positions (1) and (2) when the sector was written, the write position field of the sector in the table is set to "0". If the sector was written with the head positioned to the left of the position (2), the write position field of the sector in the table is set to "2". The distances from the center of the track to positions (1) and (2) are set smaller than the write inhibit slices (Winh).

As shown in the write inhibit slice setting tables of FIGS. 11 and 12, a write inhibit slice (Winh) is set for each combination of the above parameter values by use of the write inhibit slice setting methods of the first embodiment described above.

In the example shown in FIGS. 11 and 12, the write inhibit slices Winh0, Winh1, and Winh2 have the following relationship: Winh0>Winh1>Winh2.

Further, a write inhibit slice (Winh) can be set on either side of a target sector separately as shown in FIGS. 11 and 12, making it possible to set different write inhibit slices on the left and the right sides of the center of the track.

Still further, information on sectors on the left and right sides of each sector may be included in a write inhibit slice setting table, and a write inhibit slice may be set based on this information.

Third Embodiment

According to a third embodiment of the present invention, information on the write order and write position of each sector is stored in a RAM (memory means) in the magnetic read/write apparatus, and a write inhibit slice (Winh) is set based on this information.

Figure 13:
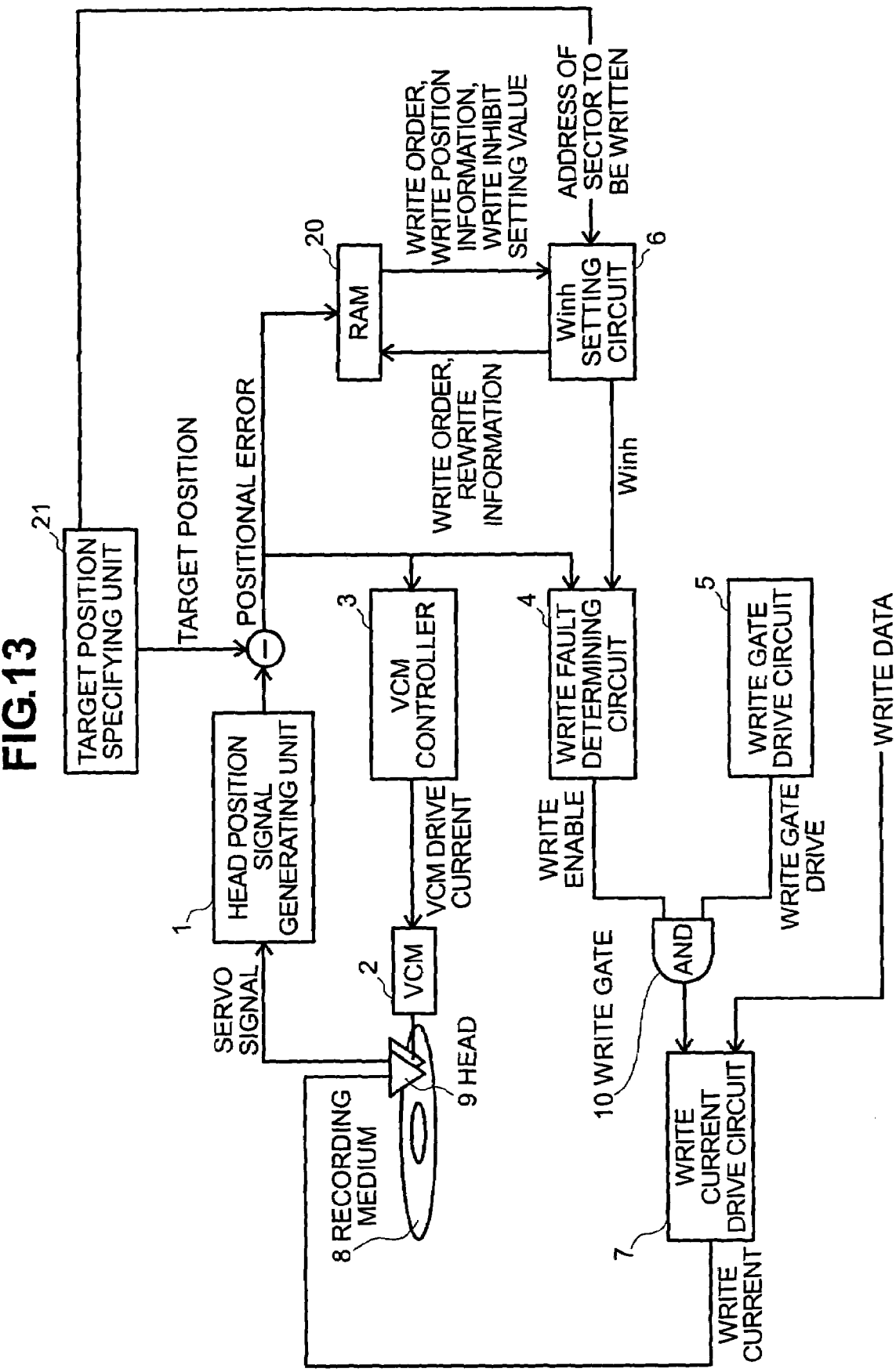
FIG. 13 is a diagram showing the configuration of a magnetic read/write apparatus according to the third embodiment of the present invention.

FIG. 13 is a diagram showing the configuration of a magnetic read/write apparatus according to the third embodiment of the present invention.

Referring to the figure, the magnetic read/write apparatus comprises: a RAM 20 for storing information on the write order and the write position of each sector; and a target position specifying unit 21 for specifying a target position based on an address. The rest of the configuration is the same as that of the first embodiment.

Description will be made below of the operation of the present embodiment.

Figure 14:
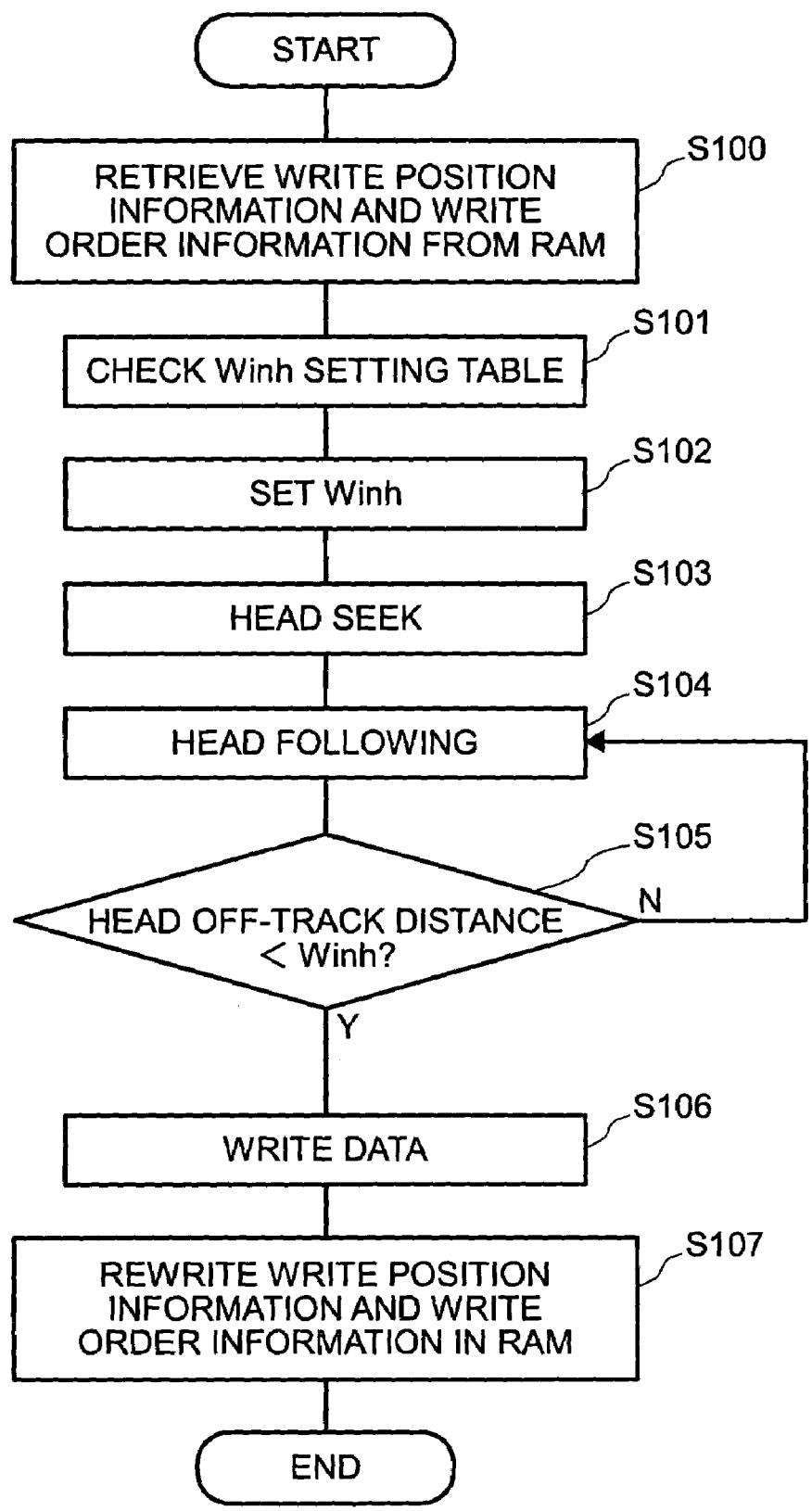
FIG. 14 is a flowchart showing the operation performed when data is written according to the third embodiment of the present invention.

FIG. 14 is a flowchart showing the operation performed when data is written according to the third embodiment.

When a data write instruction has been issued, the Winh setting circuit 6 determines the address of the sector to be written and reads the write order and the write position of the sector from the RAM 20 at step S100. The Winh setting circuit 6 checks the write inhibit slice setting table at step S101 and sets a write inhibit slice (Winh) for the write fault determining circuit 4 at step S102.

Concurrently, the target position specifying unit 21 determines the target position of the head based on the address of the sector to be written and initiates a seek operation at step S103 and a "head following" operation at step S104.

At step S105, it is determined whether the off track distance of the head is smaller than the set write inhibit slice (Winh). If it is determined that the off tack distance is not smaller than the set write inhibit slice (Winh) at step S105, the processing returns to S104 at which the head following operation is carried out again.

If, on the other hand, it is determined that the off track distance is smaller than the set write inhibit slice (Winh) at step S105, that is, the head has been positioned within the write inhibit slice (Winh), a write operation is carried out at step S106. At step S107, the amount of displacement between the write position at step S106 and the center of the track is used as write position information to rewrite the corresponding data in the RAM 20, and furthermore write order information in the RAM 20 is also rewritten.

It should be noted that if it is necessary to use information (data) other than write order and write position information to set a write inhibit slice (Winh), such information may also be stored in the RAM 20.

Fourth Embodiment

According to a fourth embodiment of the present invention, the information necessary to set a write inhibit slice (Winh) in the first embodiment is stored on a recording medium 8 (disk, etc.), and a write inhibit slice (Winh) is set based on the information stored on the recording medium 8 (disk, etc.).

Figure 15:
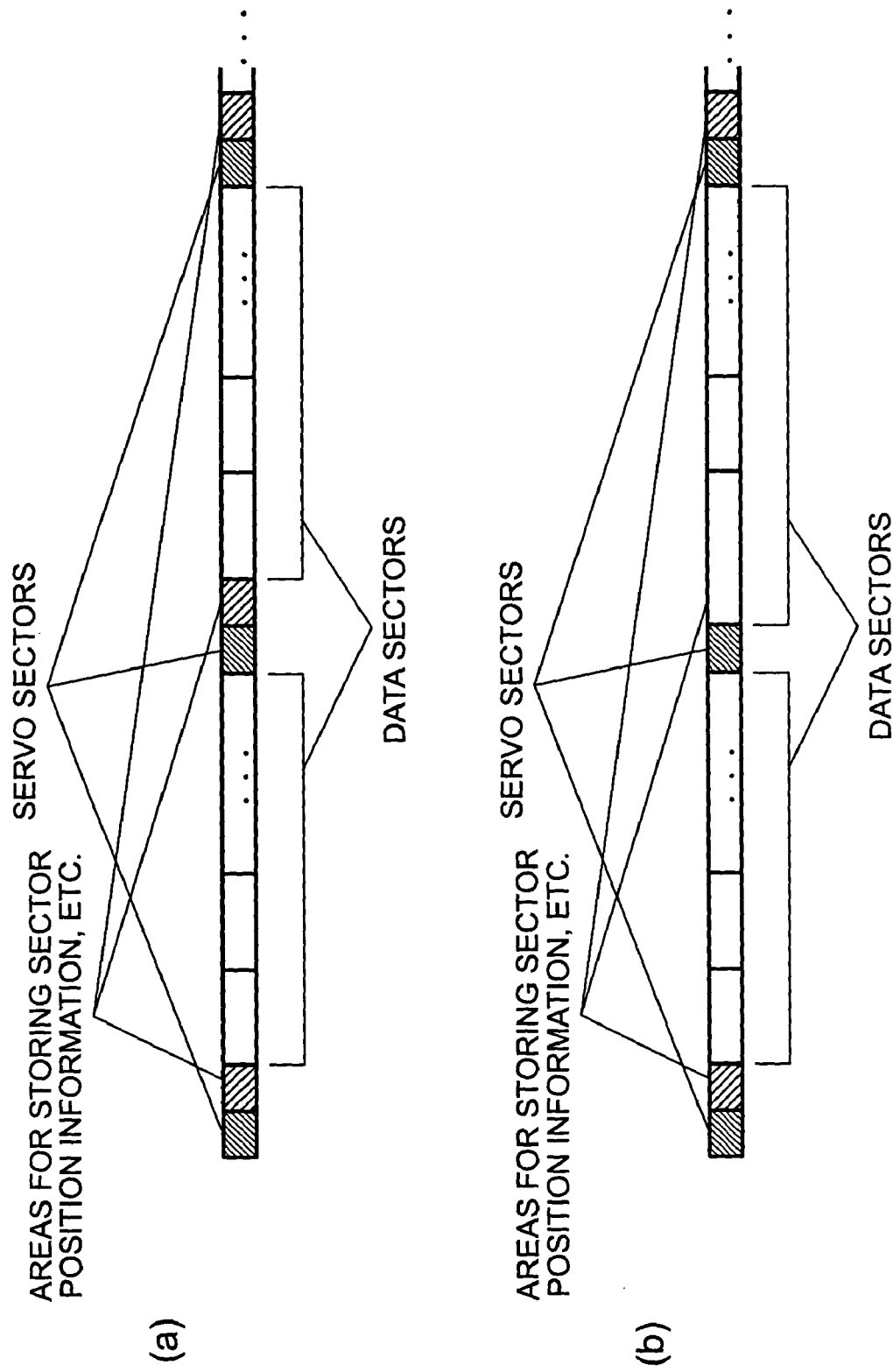
FIG. 15 includes FIGS. 15(a) and 15(b) which are explanatory diagrams each illustrating how information is written on a recording medium according to a fourth embodiment of the present invention.

FIG. 15 is an explanatory diagram illustrating how information is written on a recording medium according to the fourth embodiment.

As shown in FIG. 15(a), sector position information and other information on each data sector necessary to set a write inhibit slice are written at a position next to each servo sector beforehand, and when a data sector is actually written, the sector position information written beforehand is read to set a write inhibit slice (Winh) for the writing of the data sector.

Further, it is arranged that once sector position information has been read, the information is stored in a cache, etc. from which it is read as necessary.

It should be noted that the area for storing sector position information, etc. need not be provided next to every servo sector as shown in FIG. 15(a). For example, as shown in FIG. 15(b), it may be provided next to every two servo sectors.

Further, the area for storing sector position information, etc. may be provided for anywhere between every few and every few hundred tracks, or for every zone. Or alternatively, the area for storing sector position information, etc. may be provided in management areas provided between zones.

The operation of the present embodiment will be described below.

Figure 16:
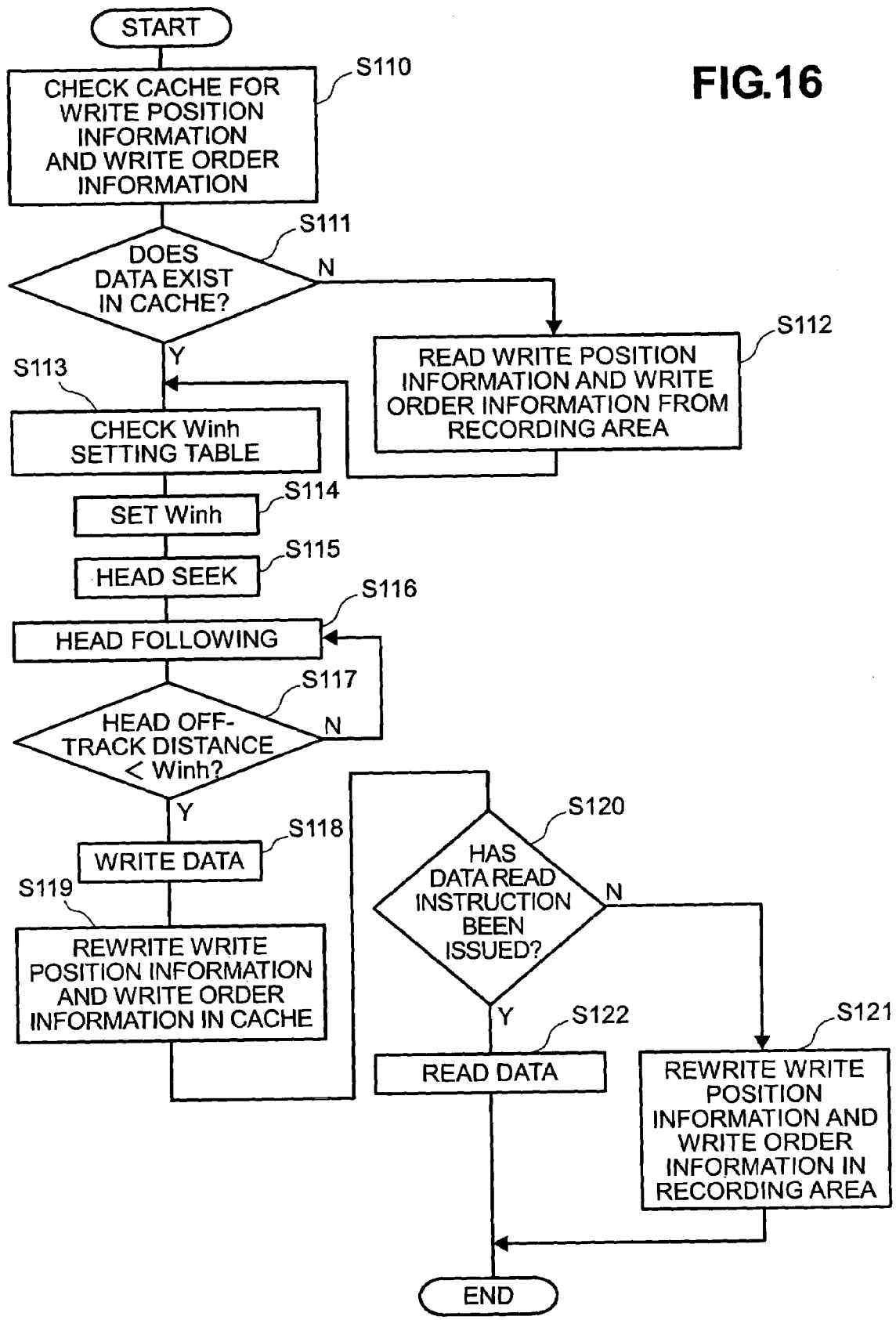
FIG. 16 is a flowchart showing the operation performed when data is written according to the fourth embodiment of the present invention.

FIG. 16 is a flowchart showing the operation performed when data is written according to the fourth embodiment.

When a data write instruction has been issued, the present embodiment determines the address of the sector to be written and checks a cache for the write order and the write position of the sector at step S110.

At step S111, it is determined whether the desired data is stored in the cache. If it is determined that the data is not stored in the cache at step S111, the write order and the write position of the sector to be written which are written on the recording medium 8 are read at step S112 and the write inhibit slice setting table is checked at step S113.

If it is determined that the data is stored in the cache at step S111, on the other hand, the write inhibit slice setting table is checked based on the data stored in the cache at step S113.

At step S114, a write inhibit slice (Winh) is set for the write fault determining circuit 4.

Concurrently, the target position specifying unit 21 determines the target position of the head based on the address of the sector to be written and initiates a seek operation at step S115 and a head following operation at step S116.

At step S117, it is determined whether the off track distance of the head is smaller than the set write inhibit slice (Winh). If it is determined that the off track distance is not smaller than the set write inhibit slice (Winh) at step S117, the processing returns to S116 at which the head following operation is carried out again.

If, on the other hand, it is determined that the off track distance is smaller than the set write inhibit slice (Winh) at step S117, that is, the head has been positioned within the write inhibit slice (Winh), data is written at step S118. At step S119, the amount of displacement between the write position at step S118 and the center of the track is used as write position information to rewrite the corresponding data in the cache, and furthermore the write order information in the cache is also rewritten.

At step S120, it is determined whether a data read instruction has been issued. If it is determined that a data read instruction has been issued at step S120, a data read operation is carried out according to the data read instruction at step S122.

If it is determined that no data read instruction has been issued at step S120, on the other hand, the data stored in the areas on the recording medium 8 for storing sector position information, etc. is rewritten such that the above rewrite operation to the cache at step S119 is reflected in them.

It should be noted that if it is necessary to use information (data) other than write order and write position information to set a write inhibit slice (Winh), such information may also be stored in the areas on the recording medium 8 for storing sector position information, etc.

It should be further noted that information on the write order and the write position of each sector may not be written at a position next to the servo sector of the sector. The information may be written at a position next to the servo sector of another sector. Then, it may be arranged that data can be written to a sector immediately after its write order and write position information has been read.

Fifth Embodiment

According to a fifth embodiment of the present invention, the number of rewrite operations performed on each sector (the rewrite count of each sector) is stored. Then, if the rewrite count of a sector exceeds a specified value, the information on sectors (tracks) adjacent to the sector is rewritten.

Figure 17:
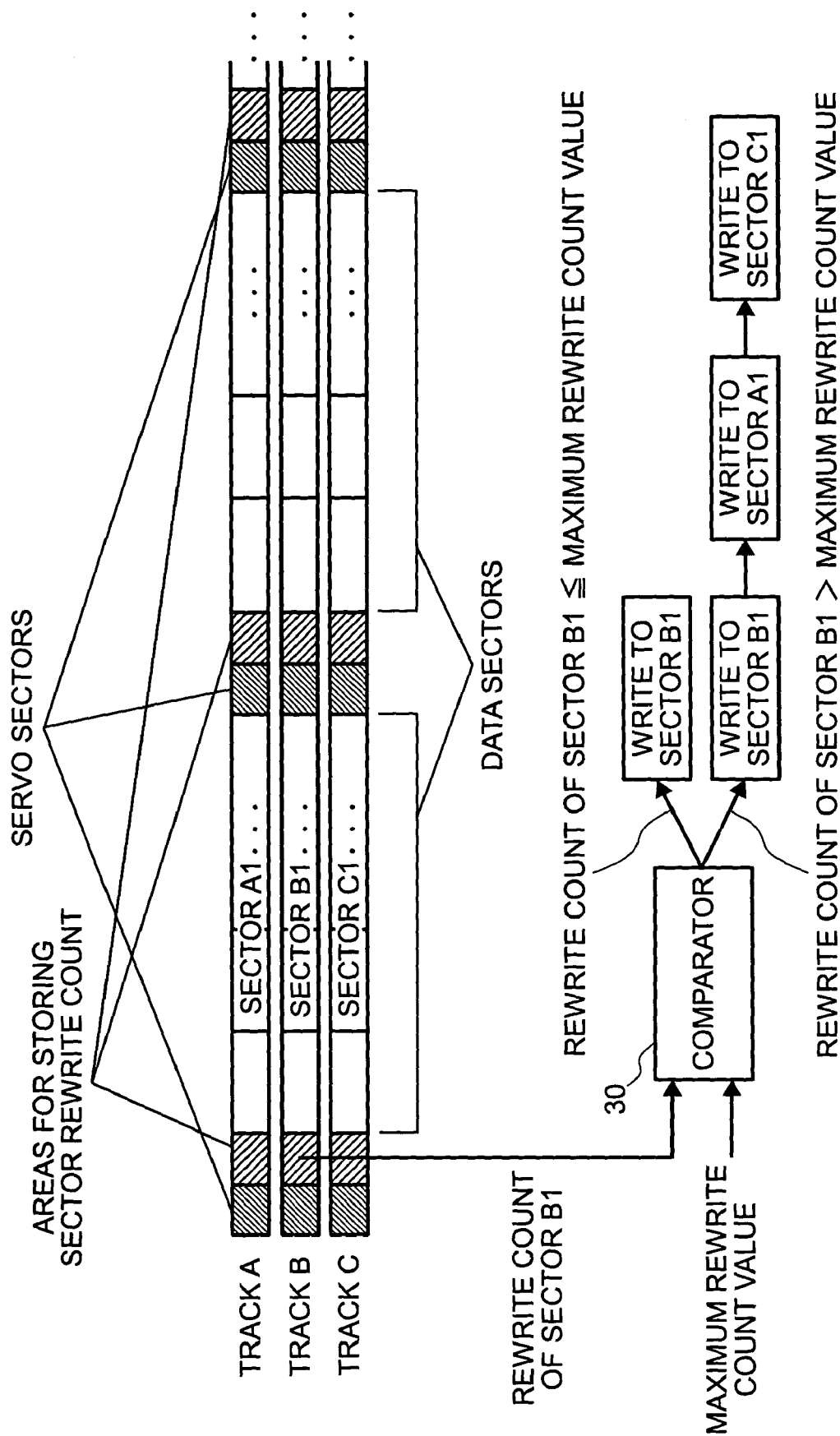
FIG. 17 is an explanatory diagram illustrating how information on the rewrite count of a sector is used to rewrite its neighboring sectors according to a fifth embodiment of the present invention.

FIG. 17 is an explanatory diagram illustrating how information on the rewrite count of a sector is used to rewrite its neighboring sectors according to the fifth embodiment.

According to the present embodiment, the rewrite count of each sector is written at a position next to the servo sector of the sector, and in a write operation, this information is read to determine whether the neighboring sectors (tracks) should be rewritten by use of, for example, a comparator 30.

For example, when a write operation is performed on a sector B1 on a track B, the rewrite count of the sector B1 is read. If the read rewrite count is smaller than a set maximum rewrite count, the sector B1 is rewritten (the write operation is performed) and the rewrite count of the sector B1 is incremented and no further processing is carried out.

If the read rewrite count is larger than the maximum rewrite count, on the other hand, not only is the rewrite operation performed on the sector B1, but the data in neighboring sectors A1 and C1 is read and then the read data is rewritten to them.

If the sectors A1 and C1 have been also rewritten (the data in the sectors A1 and C1 has been rewritten as described above), the rewrite count of the sector B1 is reset to 0 and the rewrite counts of the sectors A1 and C1 are incremented.

In the example shown in FIG. 17, an area for storing the rewrite count of each sector is provided next to its servo sector. However, the rewrite count of each sector may be written in its data sector.

Further according to the present embodiment, the value of the write inhibit slice (Winh) may be changed depending on the rewrite count of a neighboring sector (track).

Figure 18:
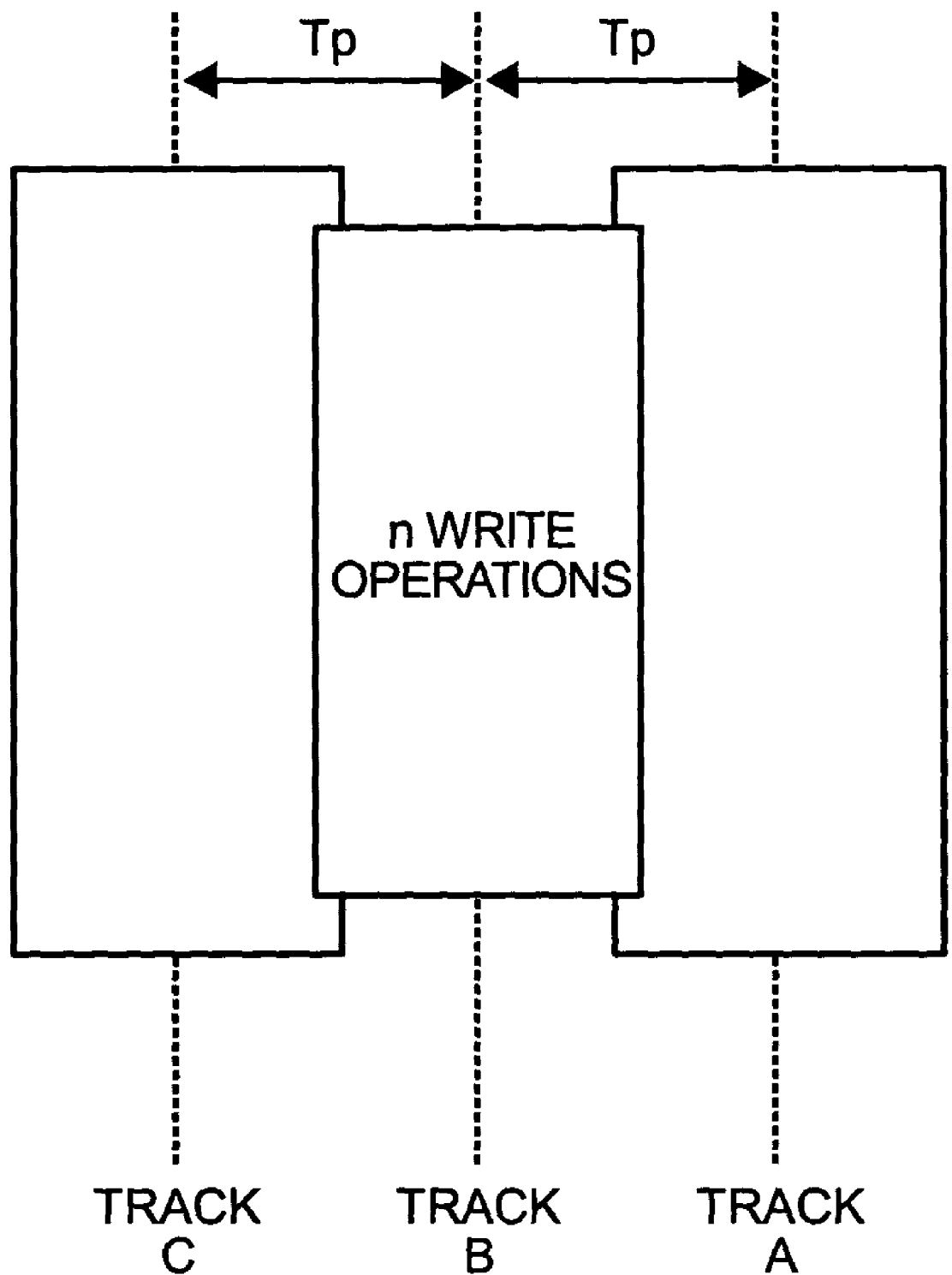
FIG. 18 is a diagram showing a track arrangement in which a write inhibit slice (Winh) is set based on the write counts of a sector according to the fifth embodiment of the present invention.
Figure 19:
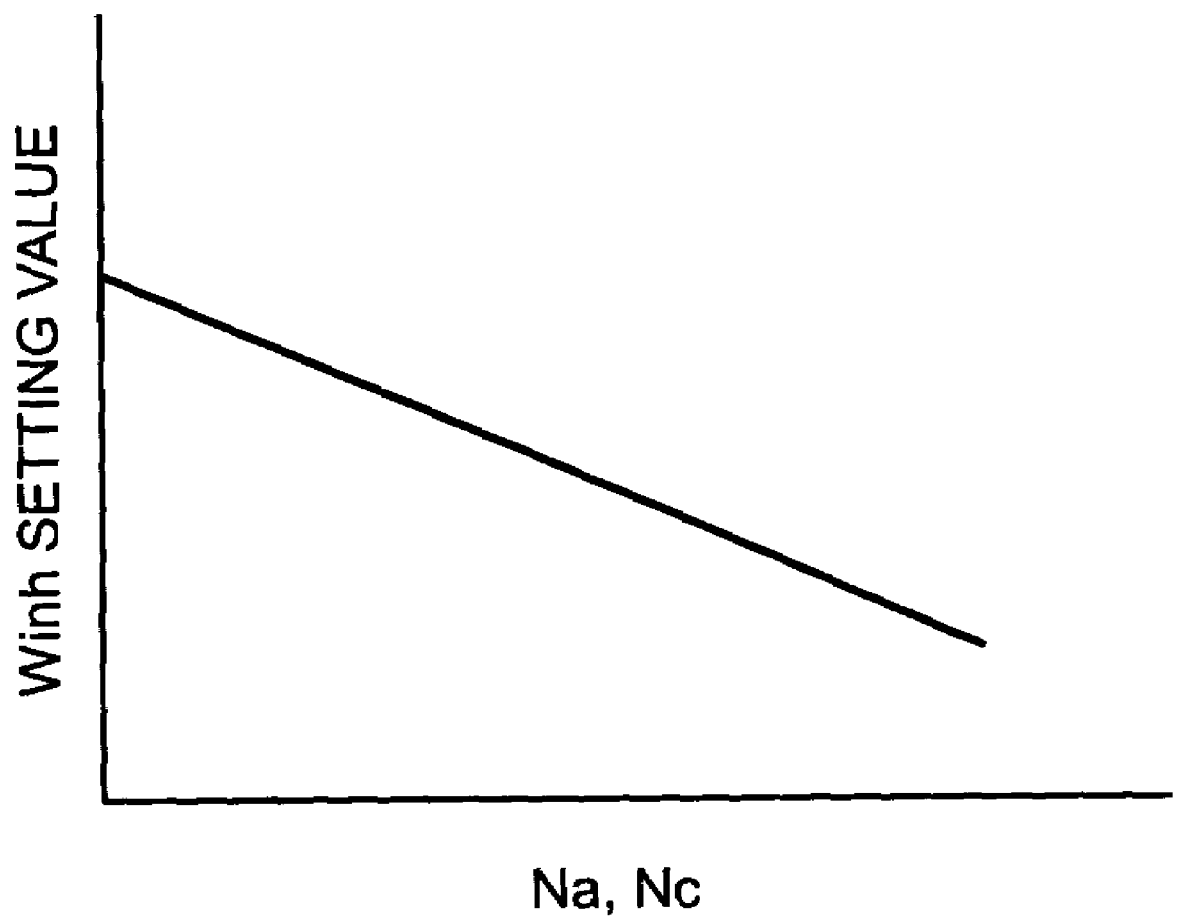
FIG. 19 is a diagram showing the relationship between the write counts and the Winh setting value according to the fifth embodiment of the present invention.

FIG. 18 is a diagram showing a track arrangement in which a write inhibit slice (Winh) is set based on the rewrite counts of a sector according to the fifth embodiment. FIG. 19 is a diagram showing the relationship between the write counts and the Winh setting value for a track according to the fifth embodiment.

As shown in FIG. 18, the write counts (Na and Nc) of a track B with respect to its neighboring tracks A and C, respectively, are stored, and a write inhibit slice (Winh) is set based on the relationship shown in FIG. 19 by use of Na and Nc.

According to the present embodiment, an allowable maximum write count value may be set for each of the tracks A and C adjacent to the track B, and whether or not data should be rewritten may be determined for each track.

Figure 20:
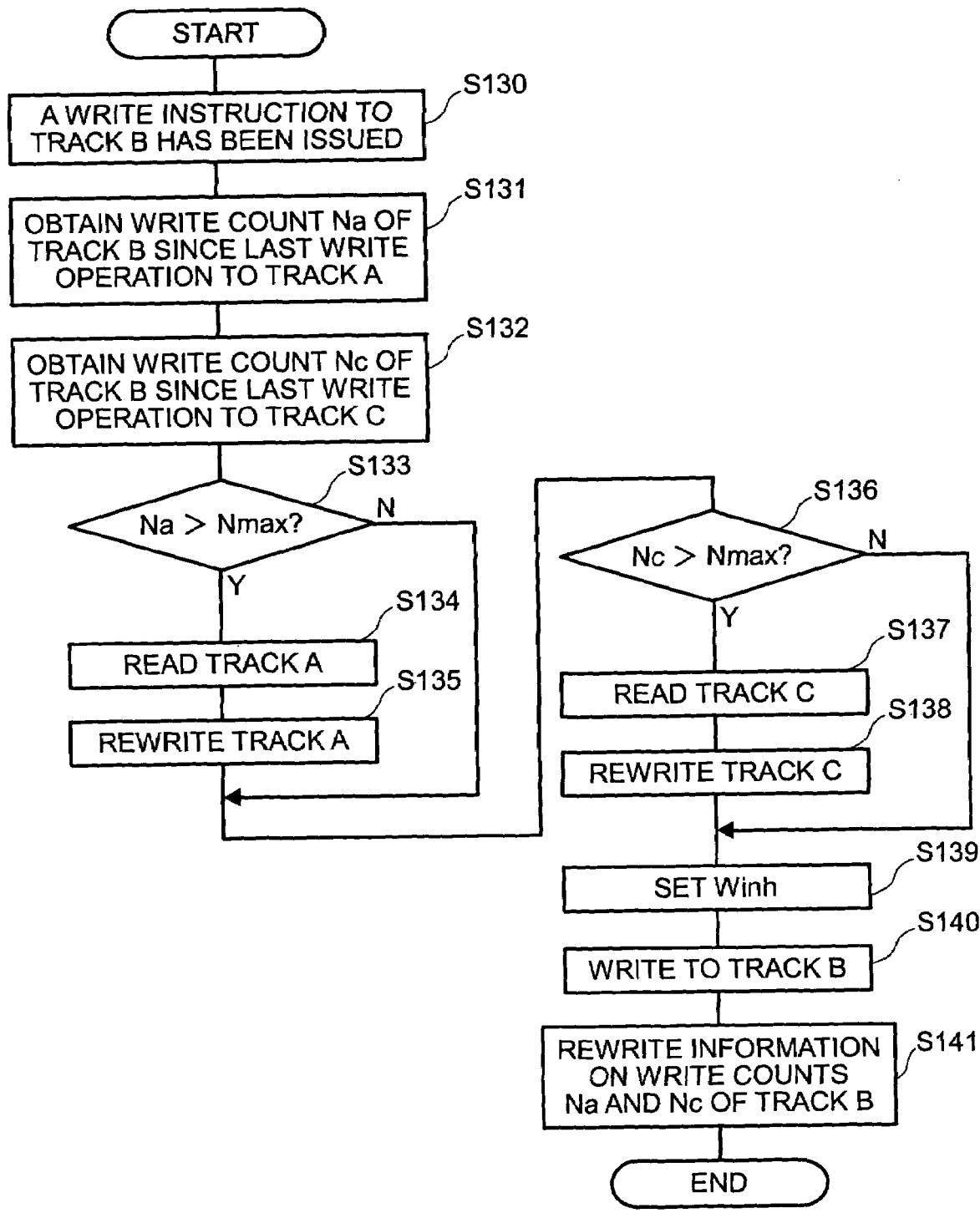
FIG. 20 is a flowchart showing the operation performed when data is written according to the fifth embodiment of the present invention.

FIG. 20 is a flowchart showing the operation performed when data is written for each track according to the fifth embodiment.

When a write instruction to the track B has been issued at step S130, the write counts (Na and Nc) of the track B with respect to the tracks A and C are obtained at steps S131 and S132, respectively. It should be noted that the write count Na is the number of write operations performed on the track B since the last write operation to the track A, while the write count Nc is the number of write operations performed on the track B since the last write operation to the track C.

At step S133, it is determined whether the write count Na is larger than the allowable maximum write count value Nmax. If it is determined that the write count Na is not larger than the allowable maximum write count value Nmax at step S133, it is determined whether the write count Nc is larger than the allowable maximum write count value Nmax at step S136, since it is not necessary to rewrite the data on the track A.

If, on the other hand, it is determined that the write count Na is larger than the allowable maximum write count value Nmax, then since the data on the track A should be rewritten, the track A is read at step S134 and the read data is written to the track A again at step S135. After that, it is determined whether the write count Nc is larger than the allowable maximum write count value Nmax at step S136.

If it is determined that the write count Nc is not larger than the allowable maximum write count value Nmax at step S136, then since it is not necessary to rewrite the data on the track C, a write inhibit slice (Winh) is set based on the write counts Na and Nc at step S139 and the track B is written at step S140.

If, on the other hand, it is determined that the write count Nc is larger than the allowable maximum write count value Nmax at step S136, then since it is necessary to rewrite the data on the track C, the track C is read at step S137 and then the read data is written to the track C again at step S138. After that, a write inhibit slice (Winh) is set based on the write counts Na and Nc at step S139 and the track B is written at step S140.

Then, the information on the write counts Na and Nc is updated at step S141.

In the above description of the present embodiment, the rewrite (write) counts are stored on a medium. However, they may be stored in the RAM 20 as in the third embodiment. This arrangement eliminates the need for the area on the recording medium 8 for storing the rewrite counts.

Sixth Embodiment

A sixth embodiment of the present invention sets a different write inhibit slice (Winh) for each head in a magnetic read/write apparatus having a plurality of heads.

Figure 21:
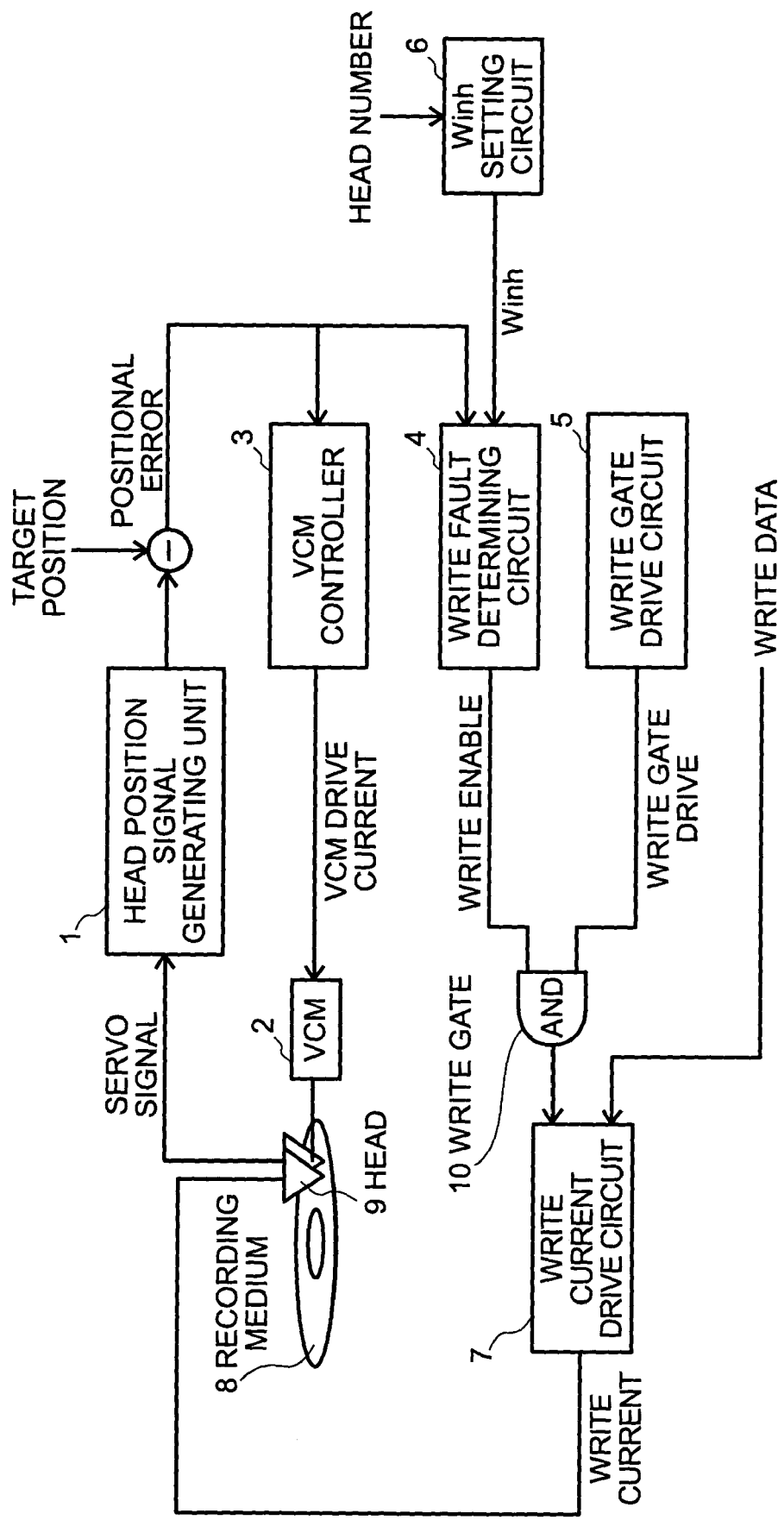
FIG. 21 is a diagram showing the configuration of a magnetic read/write apparatus according to a sixth embodiment of the present invention.

FIG. 21 is a diagram showing the configuration of a magnetic read/write apparatus according to the sixth embodiment of the present invention.

In the figure, the Winh setting circuit 6 is configured such that it receives a head number. The rest of the configuration of the present embodiment is the same as that of the first embodiment.

The present embodiment employs a plurality of heads 9. They may be each provided for one or the other surface of a single recording medium 8, or each provided for one of a plurality of recording media 8.

According to the present embodiment, a correction value for the write inhibit slice (Winh) is set for each head 9 based on such information as the degree of proximity erasure by each head 9 and the characteristics of each head 9 beforehand. When data is written, the Winh setting circuit 6 receives the number of the head which is to write the data and corrects the write inhibit slice (Winh) set for each sector based on the correction value (for the head). With this arrangement, if the position of the head which is to write the data exceeds the corrected write inhibit slice (Winh) (for a target sector), the write operation is inhibited.

Thus, according to the present invention, when data is written to a recording medium, a write inhibit slice setting means sets a write inhibit slice for each sector based on the recording state of each sector on the recording medium, making it possible to set an optimum write inhibit slice for each sector. This allows balancing the data transfer rate and the data protection as well as increasing the track density.

What is claimed is:

1. A magnetic read/write apparatus comprising:
a recording medium; and
a head for writing/reading data to/from each sector on said recording medium;
wherein said magnetic read/write apparatus further comprises a rewriting device for, when data is written to said recording medium, performing steps of:
counting the number of write operations performed on said each sector;
storing information on said number of write operations performed on said each sector;
if said number of write operations performed on a sector is larger than a predetermined value, reading data from neighboring sectors on one or both sides of said sector; and
rewriting said sector with said read data.

2. A magnetic read/write apparatus comprising:
a recording medium; and
a head for writing/reading data to/from each sector on said recording medium;
wherein said magnetic read/write apparatus further comprises:
a write inhibit slice setting device for, when data is written to said recording medium, setting a write inhibit slice for said each sector based on a recording state of said each sector on said recording medium,
wherein said write inhibit slice setting device sets said write inhibit slice for said each sector based on at least one of information on a write order of said each sector, position information on neighboring sectors, information on a degree of proximity erasure by said head, and information on rewrte counts of said neighboring sectors, wherein:
a recording area is provided on said recording medium to store at least one of said information on said write order of said each sector, said position information on said neighboring sectors, said information on said degree of proximity erasure by said head, and said information on said rewrite counts of said neighboring sectors; and
said write inhibit slice setting device reads said recording area on said recording medium and sets said write inhibit slice for said each sector based on said read information.

3. The magnetic read/write apparatus as claimed in claim 2, wherein said recording area is provided within said each sector or a management area on said recording medium.

* * * * *